United States Patent
Itagaki et al.

(10) Patent No.: US 9,762,054 B2
(45) Date of Patent: Sep. 12, 2017

(54) ELECTRIC STORAGE APPARATUS AND POWER PATH SWITCH APPARATUS

(71) Applicant: GS Yuasa International Ltd., Kyoto-shi (JP)

(72) Inventors: Takeshi Itagaki, Kyoto (JP); Takeyuki Shiraishi, Kyoto (JP)

(73) Assignee: GS YUASA INTERNATIONAL LTD, Kyoto-Shi, Kyoto (JP)

( * ) Notice: Subject to any disclaimer, the term of this patent is extended or adjusted under 35 U.S.C. 154(b) by 906 days.

(21) Appl. No.: 13/961,536

(22) Filed: Aug. 7, 2013

(65) Prior Publication Data

US 2014/0042828 A1 Feb. 13, 2014

(30) Foreign Application Priority Data

Aug. 9, 2012 (JP) .................................. 2012-177618
Jul. 12, 2013 (JP) .................................. 2013-146698

(51) Int. Cl.
*B60L 3/00* (2006.01)
*H02J 1/00* (2006.01)
*B60L 3/04* (2006.01)
*H01H 47/00* (2006.01)

(52) U.S. Cl.
CPC .............. *H02J 1/00* (2013.01); *B60L 3/0046* (2013.01); *B60L 3/0092* (2013.01); *B60L 3/04* (2013.01); *H01H 47/002* (2013.01); *H01H 2047/006* (2013.01); *Y10T 307/858* (2015.04)

(58) Field of Classification Search
None
See application file for complete search history.

(56) References Cited

U.S. PATENT DOCUMENTS 5,277,244 A * 1/1994 Mehta ..................... F23N 5/242
165/265
6,657,833 B2 12/2003 Matsuki et al.
8,344,555 B2 * 1/2013 Ichikawa ............... B60K 6/445
307/10.1

(Continued)

FOREIGN PATENT DOCUMENTS

JP 07-176253 A 7/1995
JP 10-262339 A 9/1998

(Continued)

*Primary Examiner* — Rexford Barnie
*Assistant Examiner* — David Shiao
(74) *Attorney, Agent, or Firm* — McGinn IP Law Group, PLLC.

(57) ABSTRACT

An electric storage apparatus includes: an electric storage device; a potential difference measuring unit for measuring a potential difference at two arbitrary points on a charging/discharging path for the electric storage device; a self-holding switch disposed between the two points on the charging/discharging path; a current measuring unit for measuring a current flowing on the charging/discharging path; a switch controller for controlling switching of the self-holding switch based on at least the state of the electric storage device; and an operational state determining unit for determining the operational state of the self-holding switch based on the control state of the switch controller and at least one of a result measured by the potential difference measuring unit and a result measured by the current measuring unit.

13 Claims, 11 Drawing Sheets

(56) References Cited

U.S. PATENT DOCUMENTS

| | | | |
|---|---|---|---|
| 2001/0040441 A1 | 11/2001 | Ng et al. | |
| 2002/0070608 A1* | 6/2002 | Matsuki | B23K 31/02 307/9.1 |
| 2002/0076349 A1 | 6/2002 | Aitken et al. | |
| 2005/0174711 A1* | 8/2005 | Nagai | H02H 7/18 361/93.1 |
| 2007/0115604 A1* | 5/2007 | Zettel | G01R 31/3278 361/160 |
| 2011/0071730 A1* | 3/2011 | Nakai | B62D 5/0481 701/42 |
| 2011/0109275 A1 | 5/2011 | Taniguchi | |
| 2011/0210746 A1* | 9/2011 | Yugou | B60L 3/04 324/427 |
| 2012/0191294 A1* | 7/2012 | Boiron | G01R 31/3278 701/33.8 |
| 2012/0234060 A1* | 9/2012 | Kato | B60R 25/02153 70/210 |
| 2012/0248881 A1* | 10/2012 | Chang | B60L 11/1866 307/87 |
| 2013/0120090 A1* | 5/2013 | Ball | H01H 83/04 335/1 |

FOREIGN PATENT DOCUMENTS

| | | |
|---|---|---|
| JP | 2001-352687 A | 12/2001 |
| JP | 2002-175750 A | 6/2002 |
| JP | 2003-019934 A | 1/2003 |
| JP | 2004-505244 A | 2/2004 |
| JP | 2009-060734 A | 3/2009 |
| JP | 2009-095211 A | 4/2009 |
| JP | 2010-140785 A | 6/2010 |
| JP | 2011-068178 A | 4/2011 |
| JP | 2012-100438 A | 5/2012 |

* cited by examiner

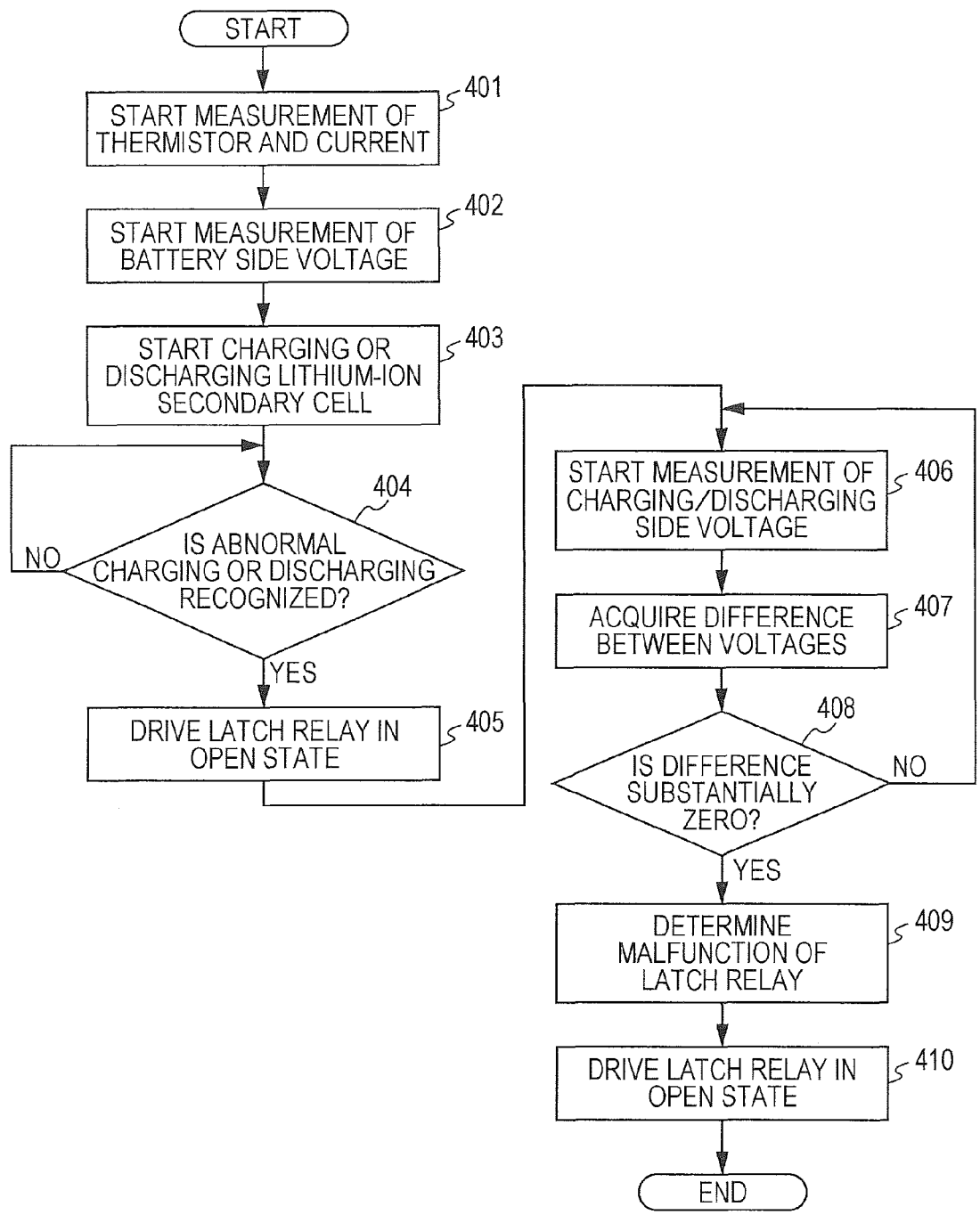

ELECTRIC STORAGE APPARATUS AND POWER PATH SWITCH APPARATUS

CROSS-REFERENCE TO RELATED APPLICATIONS

This application claims the benefit of Japanese patent applications No. 2012-177618, filed on Aug. 9, 2012, and No. 2013-146698, filed on Jul. 12, 2013, which are incorporated by reference.

FIELD

The present invention relates to an electric storage apparatus having an electric storage device, and the like.

BACKGROUND

A secondary battery such as a lithium-ion secondary cell is generally provided in the form of a battery pack having a battery cell and a protective circuit integrated with each other, so as to safely secure cooperation between the battery cell and an outside load or a battery charger to be connected to the battery cell.

The protective circuit is provided with a cutoff switch such as a relay for cutting off a power path connecting the battery cell and the outside load in case of an emergency. When the protective circuit detects abnormality such as overcharge, it immediately actuates the cutoff switch to thus cut off the power path, thereby protecting the battery cell and the outside load or the like (see, for example, paragraph [0002] in JP-A-2010-140785).

When a battery pack having a high output is used in outdoor environment as a power supply for an electric vehicle (EV), a power supply for home, or industrial power supply, malfunction may be caused. Furthermore, there is a difficulty in detecting abnormality with high stability. Thus, there is a demand for further improving the reliability of the protective circuit.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention has been accomplished in view of the above-described demand. An object of the present invention is to provide an electric storage apparatus and a power path switch apparatus that can enhance determination accuracy in switching a charging/discharging path or a power path so as to achieve highly reliable protection.

An electric storage apparatus according to an aspect of the present invention includes: an electric storage device; a potential difference measuring unit for measuring a potential difference at two arbitrary points on a charging/discharging path for the electric storage device; a self-holding switch disposed between the two points on the charging/discharging path; a current measuring unit for measuring a current flowing on the charging/discharging path; a switch controller for controlling switching of the self-holding switch based on at least the state of the electric storage device; and an operational state determining unit for determining the operational state of the self-holding switch based on the control state of the switch controller and at least one of a result measured by the potential difference measuring unit and a result measured by the current measuring unit.

BRIEF DESCRIPTION OF THE DRAWINGS

The foregoing and other features of the present invention will become apparent from the following description and drawings of an illustrative embodiment of the invention in which:

FIG. 7 is a flowchart illustrating another operation of the electric storage apparatus according to the embodiment of the present invention;

DESCRIPTION OF EMBODIMENTS

Figure 1:
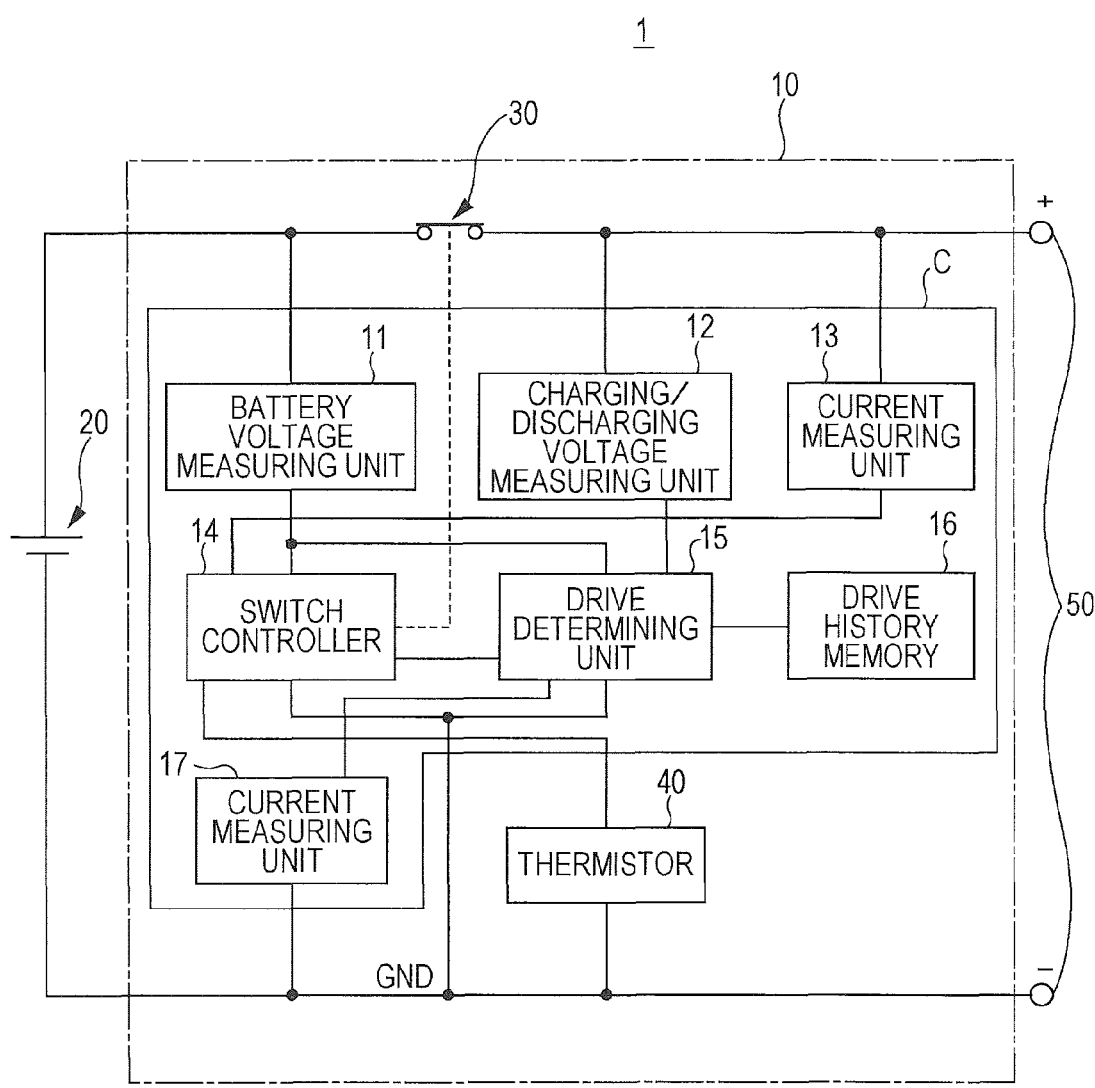
FIG. 1 is a block diagram illustrating the configuration of an electric storage apparatus according to an embodiment of the present invention.

An electric storage apparatus according to one aspect includes: an electric storage device; a potential difference measuring unit for measuring a potential difference at two arbitrary points on a charging/discharging path for the electric storage device; a self-holding switch disposed between the two points on the charging/discharging path; a current measuring unit for measuring a current flowing on the charging/discharging path; a switch controller for controlling switching of the self-holding switch based on at least the state of the electric storage device; and an operational state determining unit for determining the operational state of the self-holding switch based on the control state of the switch controller and at least one of a result measured by the potential difference measuring unit and a result measured by the current measuring unit.

In the electric storage apparatus, the current measuring unit may measure the current between the electric storage device and the self-holding switch or at one arbitrary point on a path connected to a negative electrode of the electric storage device.

In the electric storage apparatus, the operational state determining unit may cause the switch controller to drive the self-holding switch in the case where the operational state of the self-holding switch and the control state of the switch controller are different from each other.

In the electric storage apparatus, in the case where the switch controller controls the self-holding switch so as to turn it into a closed state, the operational state determining unit may determine that the operational state of the self-holding switch is an open state when a difference between an electric storage device voltage between the electric storage device and the self-holding switch and a charging/discharging voltage between the self-holding switch and a charging source or a discharging destination becomes a predetermined value or more.

In the electric storage apparatus, in the case where the switch controller controls the self-holding switch so as to turn it into a closed state, the operational state determining unit may determine that the operational state of the self-holding switch is an open state when the range of fluctuations of a difference between an electric storage device voltage between the electric storage device and the self-holding switch and a charging/discharging voltage between the self-holding switch and a charging source or a discharging destination becomes a predetermined value or more.

In the electric storage apparatus, in the case where the switch controller controls the self-holding switch so as to turn it into a closed state, the operational state determining unit may determine that the operational state of the self-holding switch is an open state when the magnitude of a difference between an electric storage device voltage between the electric storage device and the self-holding switch and a charging/discharging voltage between the self-holding switch and a charging source or a discharging destination or the range of fluctuations of the difference becomes a predetermined value or more, and further, the current measured by the current measuring unit is substantially 0 [A].

In the electric storage apparatus, in the case where the switch controller controls the self-holding switch so as to turn it into an open state, the operational state determining unit may determine that the operational state of the self-holding switch is a closed state when a difference between an electric storage device voltage between the electric storage device and the self-holding switch and a charging/discharging voltage between the self-holding switch and a charging source or a discharging destination becomes substantially 0 [V].

In the electric storage apparatus, in the case where the switch controller controls the self-holding switch so as to turn it into an open state, the operational state determining unit may determine that the operational state of the self-holding switch is a closed state when a difference between an electric storage device voltage between the electric storage device and the self-holding switch and a charging/discharging voltage between the self-holding switch and a charging source or a discharging destination becomes substantially 0 [V], and further, the current measured by the current measuring unit is substantially larger than 0 [A].

In the electric storage apparatus, the self-holding switch may be switched in response to a pulse signal.

In the electric storage apparatus, the self-holding switch may be a latch relay.

In the electric storage apparatus, a notifying unit may be provided for notifying an alarm in the case where the operational state of the self-holding switch determined by the operational state determining unit is different from the control state of the switch controller.

A power path switch apparatus according to another aspect of the present invention includes: a potential difference measuring unit for measuring a potential difference between two arbitrary points on a power path; a self-holding switch disposed between the two points on the power path; a current measuring unit for measuring a current flowing on the power path; a switch controller for controlling switching of the self-holding switch based on at least the operational state on the input side of the power path; and an operational state determining unit for determining the operational state of the self-holding switch based on the control state of the switch controller and at least one of a result measured by the potential difference measuring unit and a result measured by the current measuring unit.

A power path switch method according to still another aspect of the present invention includes the steps of measuring a potential difference between two arbitrary points on a power path; measuring a current flowing on the power path; controlling switching of a self-holding switch disposed between the two points on the power path by a switch controller based on at least the operational state on the input side of the power path; and determining the operational state of the self-holding switch based on the control state of the switch controller and at least one of the measurement result of a potential difference and the measurement result of a current.

According to the above-described aspects of the present invention, the determination accuracy with respect to the switch of the charging/discharging path or the power path can be enhanced in protecting the electric storage apparatus or the like, and therefore, the high reliability can be achieved.

Embodiments of the present invention will be described below with reference to the attached drawings.

First Embodiment

FIG. 1 is a block diagram illustrating the configuration of an electric storage apparatus 1 according to a first embodiment of the present invention.

As illustrated in FIG. 1, the electric storage apparatus 1 according to the first embodiment includes a protective circuit 10 and a lithium-ion secondary cell 20 serving as a battery cell to be connected to the protective circuit 10. Here, the lithium-ion secondary cell 20 may be a single battery cell or may be a plurality of cells in connection.

In the protective circuit 10, a battery voltage measuring unit 11 and a charging/discharging voltage measuring unit 12 measure a voltage in a main circuit serving as a charging/discharging path formed between an outside load or a battery charger connected to the electric storage apparatus 1 and the lithium-ion secondary cell 20. A current measuring unit 13 measures a current flowing in a path between a latch relay 30 and the outside load or the battery charger in the main circuit. A switch controller 14 acquires information from the battery voltage measuring unit 11, the charging/discharging voltage measuring unit 12, and other measuring units inside of the protective circuit 10, and then, controls the switching of the latch relay 30, described later, based on the information.

When a current measuring unit 17, described later, fulfills the function of the current measuring unit 13, the current measuring unit 13 may be omitted.

A drive determining unit 15 is implemented by a central processing unit (abbreviated as a "CPU") or the like. The drive determining unit 15 acquires information from each of the battery voltage measuring unit 11, the charging/discharging voltage measuring unit 12, and a drive history memory 16, and then, controls the switch controller 14 based on the information. The drive history memory 16 is implemented by a memory or other memory devices, and thus, stores the history of an operational command from the switch controller 14 to the latch relay 30. The current measuring unit 17 measures a current flowing in a path between a negative electrode of the lithium-ion secondary cell 20 and a negative electrode of the outside load or the battery charger in the main circuit. It is preferable that the above-described configuration is implemented on one and the same processor C in a monolithic manner.

When the current measuring unit 13 fulfills the function of the current measuring unit 17, the current measuring unit 17 may be omitted.

The latch relay 30 is disposed between the connection position of the battery voltage measuring unit 11 and the connection position of the charging/discharging voltage measuring unit 12 in the main circuit. The latch relay 30 is opened or closed in response to a control signal output from the switch controller 14, and is kept closed in a normal state. A thermistor 40 is a device for giving information on temperature of the lithium-ion secondary cell 20 to the switch controller 14 as an electric resistance.

In the above configuration, the electric storage apparatus 1 corresponds to an electric storage apparatus; the battery voltage measuring unit 11 and the charging/discharging voltage measuring unit 12 correspond to a potential difference measuring unit; the latch relay 30 corresponds to a self-holding switch; and the switch controller 14 corresponds to a switch controller. Moreover, the lithium-ion secondary cell 20 corresponds to an electric storage device; and the drive history memory 16 and the drive determining unit 15 correspond to an operation state determining unit. Furthermore, the current measuring unit 13 or the current measuring unit 17 corresponds to a current measuring unit.

The operation of the electric storage apparatus 1 according to the first embodiment of the present invention having the above-described configuration will be described with reference to the flowcharts of FIGS. 2 and 4.

(Operation During Charging)

A description will be given of operation when a battery charger is connected to an outside connecting terminal 50 in the protective circuit 10 so as to electrically charge the lithium-ion secondary cell 20 with reference to the flowchart of FIG. 2.

When the battery charger is connected, a current and temperature information are given to the switch controller 14 from the current measuring unit 13 and the thermistor 40, respectively, in step 101. Next, a voltage of the main circuit is given from the battery voltage measuring unit 11 to the switch controller 14 in step 102, and then, the lithium-ion secondary cell 20 is electrically charged in step 103. Here, a current value may be given from the current measuring unit 17 in step 101. The current measuring unit 17 may acquire or monitor the current value in each of the steps, although not specially explicated in the following description and each of embodiments, either.

During the charging operation, the battery voltage measuring unit 11, the current measuring unit 13, and the thermistor 40 keep monitoring the voltage value, the current value, and a resistance value in the charged state of the lithium-ion secondary cell 20 (step 104). In an abnormal charged state, that is, in the case of numeric values or numeric changes unsuitable for continuation of the charging operation such as overcharging, temperature rising-up, a decrease in voltage, or fluctuations of a voltage, the control routine proceeds to step 105, in which the operation of the latch relay 30 opens the main circuit under control.

The switch controller 14 outputs a control signal that is a pulse signal of 1 bit. The latch relay 30 is opened in response to the control signal from the switch controller 14. In this manner, the main circuit is opened, and then, the charging operation is stopped. Here, the latch relay 30 and the switch controller 14 mutually transmit and receive the signal in a sequential manner. Once the control signal is output, the latch relay 30 is kept opened without any continuous input of the control signal or the operating current.

Moreover, after the confirmation of the opening operation of the latch relay 30, a user inspects the electric storage apparatus 1. Thereafter, it is determined whether or not the lithium-ion secondary cell 20 returns to the normal state based on the monitoring of the battery voltage measuring unit 11 or the like by the switch controller 14 (step 112). If the lithium-ion secondary cell 20 returns to the normal state, the switch controller 14 outputs a control signal so as to close the latch relay 30 (step 106), and then, the main circuit is returned to the closed state. Incidentally, the main circuit may be returned to the closed state at a timing when the normally charged state is recognized again.

The above-described operation is identical to a charging operation in a well-known protective circuit. The drive history memory 16 monitors the control signal output from the switch controller 14, and then, stores the latest control state of the latch relay 30 by the switch controller 14. The control states include two states, that is, the open state and the closed state, and therefore, the state may be held as a flag of 1 bit.

Subsequently, when the closed state of the latch relay 30 is stored in step 104 or 106, the control routine proceeds to step 107, in which the charging/discharging voltage measuring unit 12 starts monitoring. The drive determining unit 15 acquires the voltage values from the battery voltage measuring unit 11 and the charging/discharging voltage measuring unit 12 that are operated heretofore, monitors a difference therebetween (step 108), and determines whether or not the difference is a predetermined value or more (step 109). It is preferable that the voltage values acquired from the battery voltage measuring unit 11 and the charging/discharging voltage measuring unit 12 take a time width of about several milliseconds in order to distinguish a noise, and take an average value, a center value, or the like during the time. The voltage value measured by the battery voltage measuring unit 11 corresponds to an electric storage device voltage value; and the voltage value measured by the charging/discharging voltage measuring unit 12 corresponds to a charging/discharging voltage value.

As the determination result in step 109, if the difference between the voltage values is less than the predetermined value, the control routine returns to step 107, and then, the drive determining unit 15 continues monitoring each of the measurement values. On the other hand, if the difference is the predetermined value or more, the control routine proceeds to step 110, in which the drive determining unit 15 determines the malfunction of the latch relay 30, and then, outputs the determination result to the switch controller 14. The switch controller 14 that has received the determination result outputs a control signal for closing the latch relay 30 (step 111) to drive the latch relay 30.

Here, a description will be given of the malfunction of the latch relay 30 and a correcting operation therefor. Even in the state in which the latch relay 30 is closed under control by a series of operations in steps 101 to 106, the latch relay 30 may be independently operated so as to be possibly opened owing to a mixture of a pulse noise from the outside, wherein the noise cannot be distinguished from the control signal as a pulse signal of 1 bit.

In the present embodiment, the actual open/closed state of the main circuit by the operation of the latch relay 30 is checked based on the measurement of the voltages at upstream side and downstream side of the latch relay 30 in the main circuit. Thus, the actual state is referred to in addition to the control state of the protective circuit 10, thereby determining the actual state of the switch control in the main circuit.

Figure 3A:
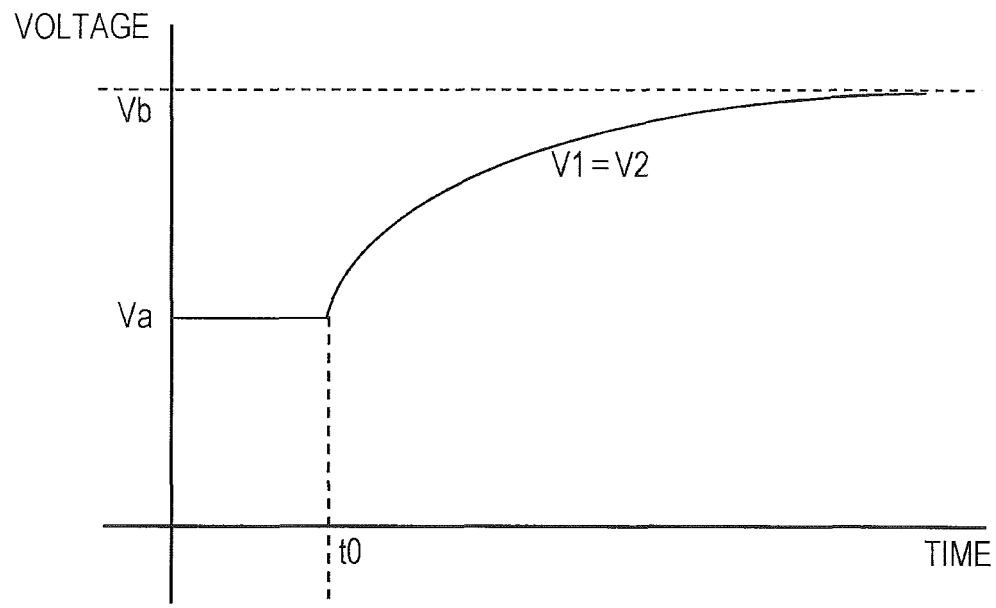
FIG. 3A is a graph illustrating the operation of the electric storage apparatus according to the first embodiment of the present invention.
Figure 3B:
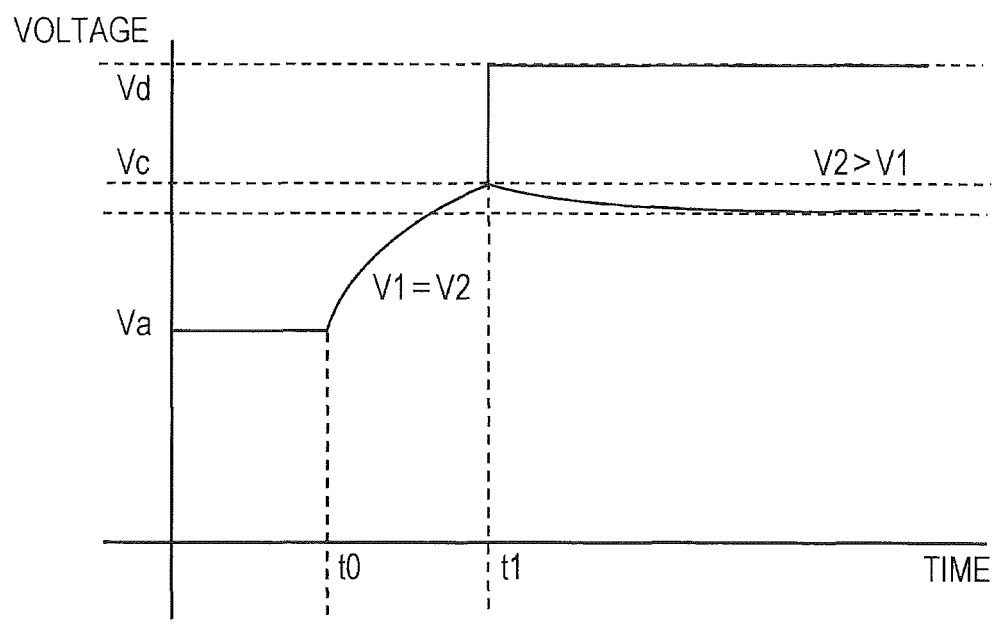
FIG. 3B is another graph illustrating the operation of the electric storage apparatus according to the first embodiment of the present invention.

Specifically, as illustrated in FIG. 3A, if the latch relay 30 is normally held in the closed state, a voltage V1 measured by the battery voltage measuring unit 11 and a voltage V2 measured by the charging/discharging voltage measuring unit 12 are equal to each other during a charging period of time (after a timing t0) in which a charging start time voltage Va reaches a fully charged voltage Vb. In contrast, as illustrated in FIG. 3B, when the latch relay 30 is opened (after a timing t1), the voltage V1 measured by the battery voltage measuring unit 11 is gradually decreased from a voltage Vc owing to the characteristics of the battery: in contrast, a charging voltage Vd on the battery charger side is directly reflected on the voltage V2 measured by the charging/discharging voltage measuring unit 12.

Consequently, in the case where a sufficiently large difference between the voltages, i.e., a sufficiently large absolute value |V2−V1| is obtained, and also the state of the drive history memory 16 is not caused by the control by the protective circuit 10, the main circuit is determined to be open and the malfunction of the latch relay 30 is recognized.

In this manner, according to the electric storage apparatus 1 in the first embodiment, a potential is measured between two points where the latch relay 30 is held in the main circuit. It is possible to confirm based on the measurement result whether or not the open or closed state of the main circuit correctly reflects the control by the protective circuit. Consequently, it is possible to enhance the determination accuracy of the malfunction of the circuit open or closed state caused by the intrusion of an outside noise or the like. Incidentally, it is preferable that the correction of the voltage V1 measured by the battery voltage measuring unit 11 and the voltage V2 measured by the charging/discharging voltage measuring unit 12 is performed in consideration of a voltage drop in the closed state of the latch relay 30 in order to enhance the detection accuracy.

Moreover, in the present embodiment, the use of the latch relay 30 as the switch for the main circuit can produce the following effects.

In a relay used in a normal protective circuit, it is necessary to energize a coil serving as an incorporated mechanism all the time during operation. Especially during the drive, operation is achieved when a relay receives a current from a storage battery inside of an electric storage apparatus, thereby causing voltage fluctuations of the lithium-ion secondary cell 20. Furthermore, while the current flows in the coil, the impedance of the coil also is fluctuated, thus fluctuating the current flowing in the coil. This causes the voltage fluctuations of the lithium-ion secondary cell 20. The voltage fluctuations of the battery prohibit the accurate voltage measurement in the main circuit.

To the contrary, the latch relay 30 in the present embodiment is a self-holding switch that is kept in the open or closed state without any continuous flow of the current from each of the units in the protective circuit 10. Therefore, there are few voltage fluctuations (i.e., few influences) in a section upstream and downstream of the latch relay 30 including the lithium-ion secondary cell 20 in the main circuit.

Thus, the voltages measured by the battery voltage measuring unit 11 and the charging/discharging voltage measuring unit 12 can be obtained as the stable values. The switch controller 14 and the drive determining unit 15 that monitor the voltages can make the highly accurate determination.

(Operation During Discharging)

Next, a description will be given of an operation in the case where an outside load to be operated by electric power from the electric storage apparatus 1 is connected to the outside connecting terminal 50 of the protective circuit 10, and then, the lithium-ion secondary cell 20 electrically discharges with reference to the flowchart of FIG. 4.

The outside load is connected to the electric storage apparatus 1. When the outside load is started to be operated, the current value, temperature information, and voltage value indicating the discharging state of the lithium-ion secondary cell 20 in steps 201 and 202 are given by the current measuring unit 13, the thermistor 40, and the battery voltage measuring unit 11 to the switch controller 14.

During the operation of the outside load, the switch controller 14 keeps monitoring the voltage value, current value, and resistance value obtained from the units, respectively (step 203). In the case where the discharging state of the lithium-ion secondary cell 20 is regarded as being abnormal, specifically, there are numerals or numerical variations unsuitable for operational continuation of the lithium-ion secondary cell 20, for example, an increase in temperature, a decrease in voltage, or fluctuations, it is determined that the electric storage apparatus 1 electrically discharges in an abnormal manner. Thus, the control routine proceeds to step 204, in which the latch relay 30 is operated, thereby controlling to turn the main circuit into the open state.

In this case, it is preferable that another electric storage apparatus 1 is connected to the outside load so as to continue the operation, whereas the old electric storage apparatus 1 is inspected or maintained.

Subsequently, when the numerical abnormality is eliminated by inspection, maintenance, or the like, it is determined whether or not the lithium-ion secondary cell 20 is returned to a normal state based on monitoring of the battery voltage measuring unit 11 or the like by the switch controller 14 (step 211). If the lithium-ion secondary cell 20 is returned to the normal state, the latch relay 30 is turned again into the closed state under the control of the switch controller 14 (step 205). The electric storage apparatus 1 can be connected to and cooperated with the outside load again. Either in the normal operational state in step 203 or the return state after the detection of the abnormality in step 205, information about control for turning the latch relay 30 into the open state is stored in the drive history memory 16 as the latest state. When the closed state of the latch relay 30 is recognized, the charging/discharging voltage measuring unit 12 performs a monitoring operation in step 206.

The following operation is similar to that at the time of charging. The drive determining unit 15 acquires the voltage values from the battery voltage measuring unit 11 and the charging/discharging voltage measuring unit 12 and monitors the difference therebetween similarly to the operation during charging (step 207). If the difference therebetween is less than the predetermined value (step 208), the control routine returns to step 206, and then, the drive determining unit 15 keeps monitoring the measurement values. In contrast, if the difference is the predetermined value or more (step 208), the control routine proceeds to step 209. The chive determining unit 15 determines the malfunction of the latch relay 30. The switch controller 14 that has received the determination result outputs a control signal so as to turn the latch relay 30 into the closed state (step 210).

In step 208, the voltage V1 from the battery voltage measuring unit 11 when the latch relay 30 is turned into the open state is equal to the voltage when the latch relay 30 is in the closed state. The voltage V2 measured by the charging/discharging voltage measuring unit 12 substantially floats because the main circuit is in the open state.

In this manner, in either of the charging and discharging operations, the electric storage apparatus 1 in the first embodiment can accurately measure the potential between the two points where the latch relay 30 is held therebetween in the main circuit, and further, can confirm whether or not the open or closed state of the main circuit correctly reflects the control by the protective circuit. Consequently, it is possible to enhance the determination accuracy with respect to the power path switch in addition to the power path cutoff in the emergency so as to achieve high reliability.

Second Embodiment

An electric storage apparatus according to a second embodiment of the present invention is featured by making a determining technique by a drive determining unit 15 during charging different from that of the first embodiment. Therefore, the configuration is identical to that of the first embodiment. Explanation will be made below on the operation with reference to the flowchart of FIG. 5.

First, after the start of operation, operation until the state of a latch relay 30 is stored by a switch controller 14 in a drive history memory 16 is similar to that in the first embodiment. Therefore, the operations in steps 101 to 106 in FIG. 2 are performed.

Next, the control routine proceeds to step 301, in which a charging/discharging voltage measuring unit 12 starts monitoring. At this time, the drive determining unit 15 takes a monitoring time by the charging/discharging voltage measuring unit 12 as a time width where a significant change can be observed. Subsequently, the drive determining unit 15 starts monitoring a battery voltage measuring unit 11 in synchronism with the monitoring time by the charging/discharging voltage measuring unit 12 (step 302), and then, takes a difference therebetween (step 303), so as to determine whether or not the difference signifies a voltage fluctuation having a given change width (step 304).

If the voltage fluctuation having a given change width is found, the control routine proceeds to step 305, in which the drive determining unit 15 determines the malfunction of the latch relay 30. The switch controller 14 that has received the determination result outputs a control signal instructing to close the latch relay 30 (step 306).

Figure 6:
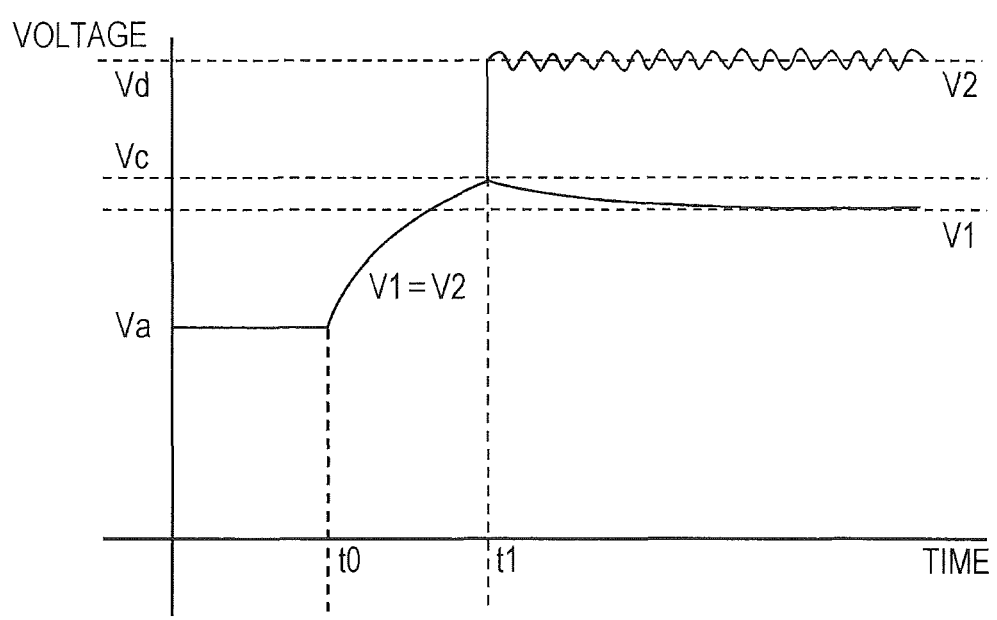
FIG. 6 is a graph illustrating the operation of the electric storage apparatus according to the second embodiment of the present invention.

The operations in steps 303 and 304 are based on the following principle. Specifically, when the latch relay 30 is opened, it is separated from the lithium-ion secondary cell 20 so that a voltage measured by the charging/discharging voltage measuring unit 12 becomes unstable, as illustrated in FIG. 6. A voltage V2 measured by the charging/discharging voltage measuring unit 12 reflects a charging voltage Vd on a battery charger side, and therefore, a ripple component included in the charging voltage Vd can be directly measured. In contrast, since a voltage V1 as a DC power supply on the side of the lithium-ion secondary cell 20 normally does not include any ripple component, the ripple component as a difference therebetween can be extracted as it is.

Consequently, in the case where the fluctuation of an absolute value |V2−V1| of the difference in voltage is greater than a predetermined value, the malfunction of the latch relay 30 is recognized in the same manner as in the first embodiment.

In the case where the average of the voltage V2 is substantially the same as the voltage V1, the absolute value |V2−V1| of the difference in voltage becomes small. The predetermined value used for determination or comparison needs to be precise. In the present embodiment, the ripple component is measured for comparison based not on the simple comparison of the numerical magnitude but on qualitative study, thus achieving more accurate determination.

As described in the first embodiment, the latch relay 30 is a self-holding switch which can be kept in the open or closed state without any application of a current from each of the units in the protective circuit 10, and therefore, the latch relay 30 itself does not cause the fluctuations of the voltage in the main circuit. This configuration is suitable for monitoring the ripple component.

In this manner, according to the electric storage apparatus in the second embodiment, a potential fluctuation is measured between two positions where the latch relay 30 is held in the main circuit. It is possible to confirm based on the measurement result whether or not the open or closed state of the main circuit correctly reflects the control by the protective circuit. Consequently, it is possible to reduce the possibility of the malfunction of the protective circuit caused by the intrusion of an outside noise or the like, so as to achieve highly accurate determination.

Incidentally, the descriptions have been given above of the first and second embodiments in which the electric storage apparatus 1 is designed to determine the malfunction when the latch relay 30 is controlled to be turned into the closed state by the switch controller 14 in the main circuit. However, the electric storage apparatus 1 may be designed to determine the malfunction when the latch relay 30 is controlled to be turned into the open state.

FIG. 7 is a flowchart illustrating an operation in one example.

In the same manner as in the above-described embodiments, in the state in which each of measuring units in a protective circuit 10 starts measuring (steps 401 and 402), charging is started during a charging operation (step 403) whereas discharging follows the operation of an outside load during a discharging operation.

Next, it is determined whether or not there is abnormality such as overcharging or overdischarging in the charged or discharged state (step 404). If there is abnormality, a latch relay 30 is driven to be turned into an open state (step 405).

In this state, a charging/discharging voltage measuring unit 12 starts monitoring (step 406). A drive determining unit 15 acquires voltage values from a battery voltage measuring unit 11 and the charging/discharging voltage measuring unit 12 that have been operated heretofore, and then, obtains a difference therebetween (step 407).

A main circuit monitors voltages V1 and V2 at two points where the latch relay 30 is held as the same potentials. In the case where the magnitude |V2−V1| of the difference between the voltages becomes substantially 0 [V] (step 408), the drive determining unit 15 determines the malfunction of the latch relay 30 (step 409), thus controlling a switch controller 14 in such a manner as to turn the latch relay 30 into the open state (step 410).

Incidentally, "substantially 0 [V]" in step 408 signifies the case where the magnitude |V2−V1| continuously falls within an error range of the precision of a measurement device during a predetermined period of time (e.g., 0.3 second) or more or the case where the magnitude |V2−V1| is determined at a predetermined time interval (e.g., 0.1 second) and falls within an error range of the accuracy of a measuring device a predetermined number of times (e.g., 3 times) or more.

In contrast, in the case where the magnitude |V2−V1| is regarded as not 0 [V] but a significant value, the control routine returns to step 406, and then, the drive determining unit 15 keeps monitoring each of the measurement values.

In this manner, even if the protective circuit 10 is operated in the open state, the electric storage apparatus 1 is provided with the latch relay 30, and further, the voltages at the two points upstream side and downstream side of the latch relay 30 are measured, thus reducing the possibility of the malfunction of the protective circuit so as to achieve the highly accurate determination.

Third Embodiment

An electric storage apparatus according to a third embodiment of the present invention is featured by determination in consideration of a current in addition to a voltage in a drive determining unit 15. Therefore, the configuration is identical to that of the first embodiment. Explanation will be made below on the control in which determination based on a current value is added to determination based on a voltage value in the above-described embodiments with reference to the flowcharts of FIGS. 8A and 8B.

Figure 2:
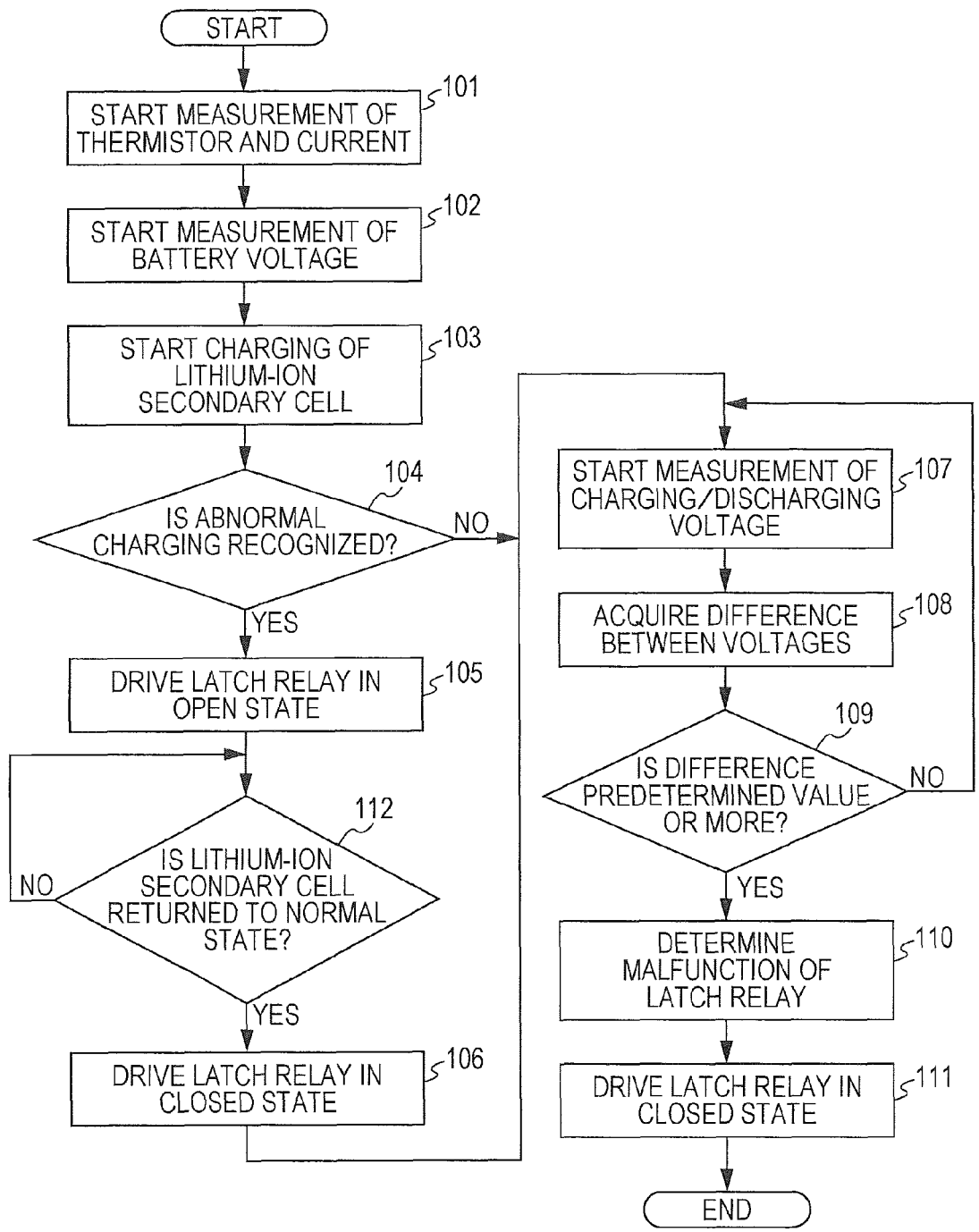
FIG. 2 is a flowchart illustrating the operation of an electric storage apparatus according to a first embodiment of the present invention.
Figure 8A:
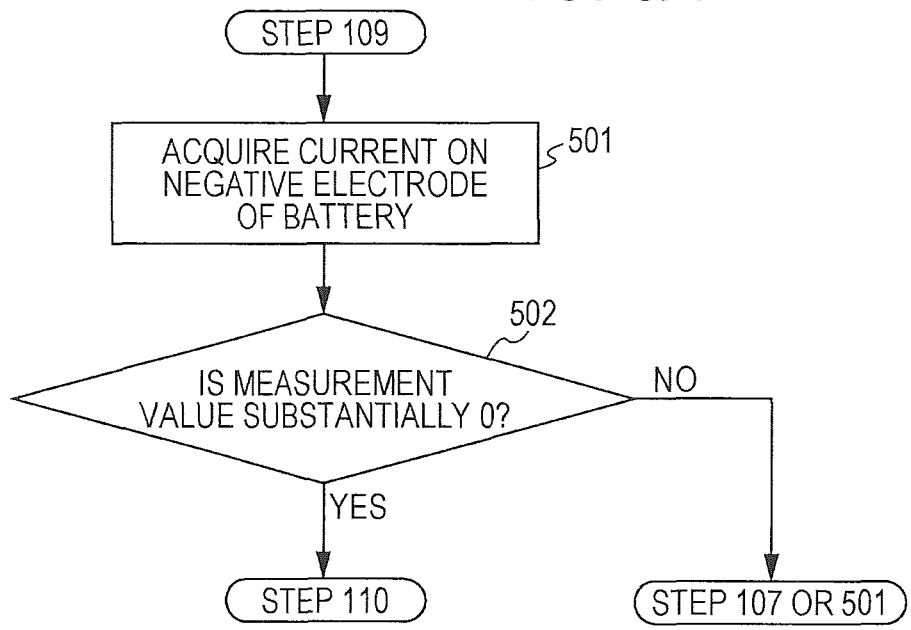
FIG. 8A is a flowchart illustrating the operation of an electric storage apparatus according to a third embodiment of the present invention.

When a difference between voltage values measured by a battery voltage measuring unit 11 and a charging/discharging voltage measuring unit 12 is equal to or more than a predetermined value in step 109 in the flowchart of FIG. 2 during charging, the drive determining unit 15 transitions to step 501 in the flowchart of FIG. 8A. Moreover, the drive determining unit 15 acquires a current monitored by a current measuring unit 17, and then, determines in step 502 whether or not the value is substantially 0 [A]. Here, "substantially 0 [A]" signifies not only that no flow of a measured current is detected but also that a significant value within an error range of accuracy of the current measuring unit 17 is detected.

In the case where it is determined that the current is substantially 0 [A], the drive determining unit 15 transitions to step 110 in the flowchart of FIG. 2, and then, determines the malfunction of a latch relay 30 so as to allow a switch controller 14 to drive the latch relay 30. In contrast, in the case where it is determined that the current is not substantially 0 [A], the drive determining unit 15 transitions to step 107 or 501, and then, it continues determining the operational state of the latch relay 30 based on the voltage value and the current value.

Figure 4:
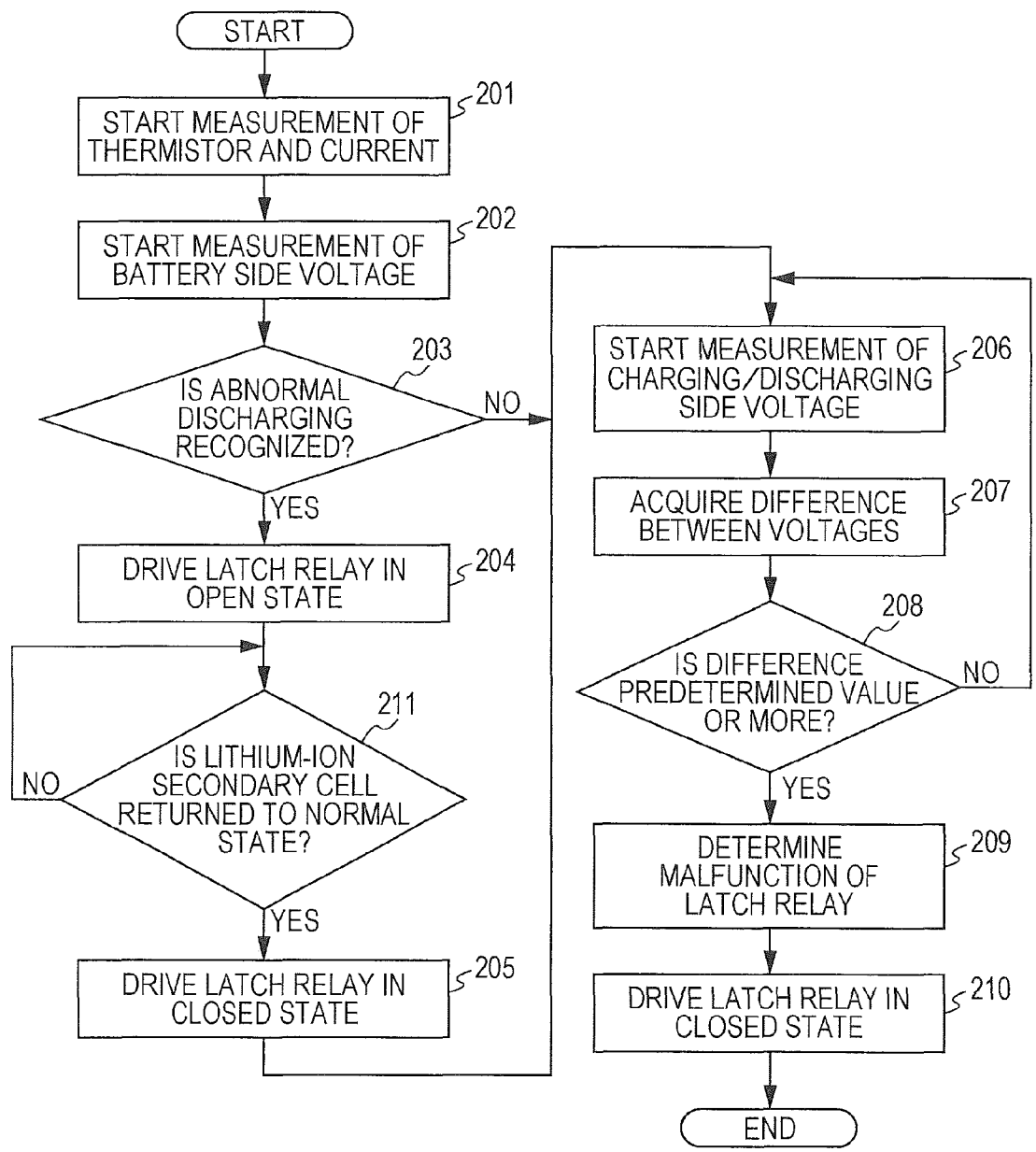
FIG. 4 is a flowchart illustrating the operation of the electric storage apparatus according to the first embodiment of the present invention.

During discharging, the operations in steps 501 and 502 are performed between steps 208 and 209 in the flowchart of FIG. 4.

Figure 5:
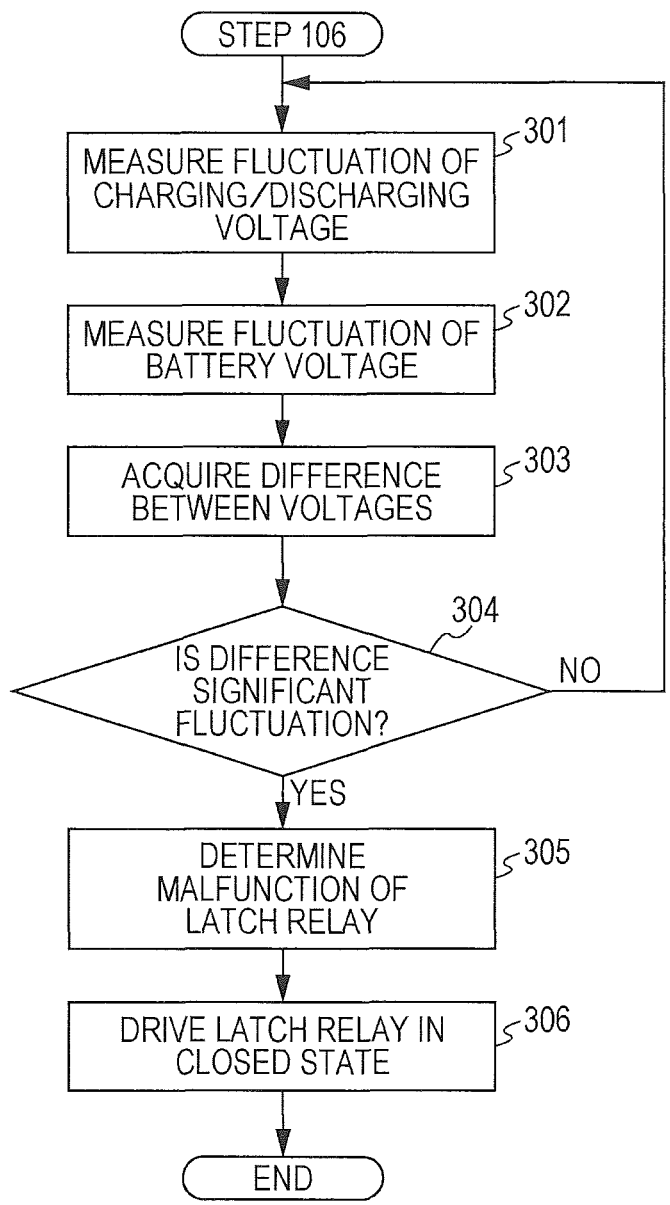
FIG. 5 is a flowchart illustrating the operation of an electric storage apparatus according to a second embodiment of the present invention.

The drive determining unit 15 may allow the operations in steps 501 and 502 to be performed between steps 304 and 305 in the flowchart of FIG. 5.

Next, explanation will be made on control added with determination based on a current value in determining malfunction when the latch relay 30 is controlled to be turned into an open state with reference to the flowchart of FIG. 7 and the flowchart of FIG. 8B.

Figure 8B:
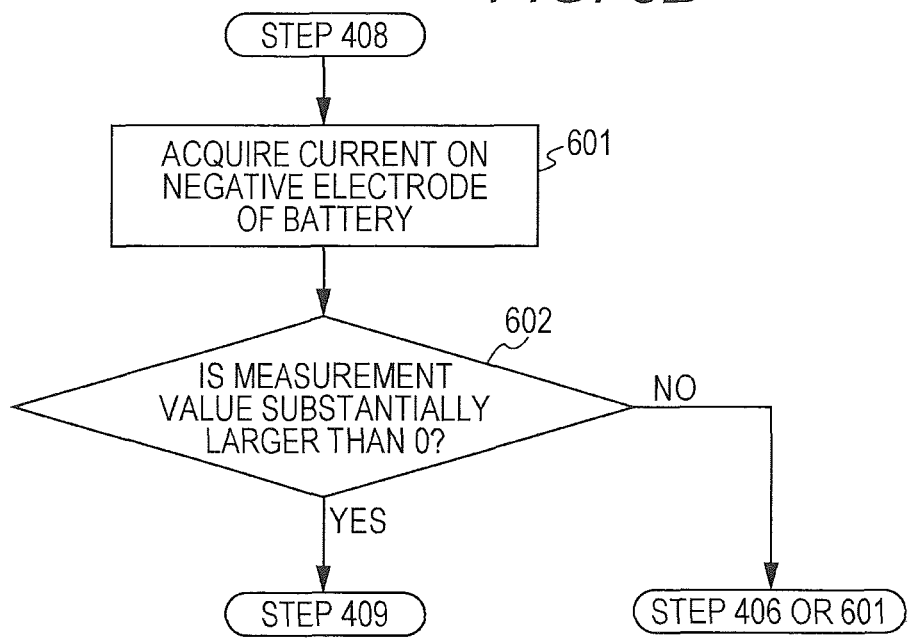
FIG. 8B is another flowchart illustrating the operation of the electric storage apparatus according to the third embodiment of the present invention.

The drive determining unit 15 transitions to step 601 in the flowchart of FIG. 8B when the difference between the voltage values measured by the battery voltage measuring unit 11 and the charging/discharging voltage measuring unit 12 is substantially 0 [V] in step 408 in the flowchart of FIG. 7. Moreover, the drive determining unit 15 acquires a current monitored by a current measuring unit 17, and then, determines in step 602 whether or not the value is substantially larger than 0 [A]. Here, "substantially larger than 0 [A]" signifies not only that the flow of a measured current is detected but also that a significant value beyond an error range of accuracy of the current measuring unit 17 is obtained.

In the case where it is determined that the current value is substantially larger than 0 [A], the drive determining unit 15 transitions to step 409 in the flowchart of FIG. 7, and then, determines the malfunction of a latch relay 30 so as to allow a switch controller 14 to drive the latch relay 30. In contrast, in the case where it is determined that the current is not substantially larger than 0 [A], the drive determining unit 15 transitions to step 406 or 601, and then, it continues determining the operational state of the latch relay 30 based on the voltage value and the current value.

As described above, according to the electric storage apparatus in the third embodiment, the determination based on the current value measured by the current measuring unit 17 is utilized in addition to the voltage values measured by the battery voltage measuring unit 11 and the charging/discharging voltage measuring unit 12, so that the accuracy of the determination of the malfunction of the latch relay 30 can be further enhanced.

Although the determination based on the current value illustrated in FIGS. 8A and 8B is carried out after the determination based on the voltage value in the above-described descriptions, the determination based on the current value may be carried out before the determination based on the voltage value or in parallel to the determination based on the voltage value. Particularly in the case of the parallel determination, the latch relay 30 can be rapidly controlled, so that the reliability of the electric storage apparatus 1 can be enhanced.

In the above, the determination based on the current value has been based on the current value monitored by the current measuring unit 17. However, the determination based on the current value may be based on the current value monitored by the current measuring unit 13. Alternatively, the current measuring units 13 and 17 may be concurrently used.

However, the single use of the current measuring unit 17 as described above is preferred for the following reason. Since the current measuring unit 13 is disposed between the outside connecting terminal 50 and the latch relay 30, a leakage current flows from the battery charger or the outside load connected to the outside connecting terminal 50, thereby raising a concern that the current owing to the lithium-ion secondary cell 20 cannot be correctly detected. In contrast, the single use of the current measuring unit 17 for directly measuring the current flowing in a negative electrode of the lithium-ion secondary cell 20 can achieve the highly accurate determination with high reliability.

The current measuring unit 17 is designed to directly measure the current flowing in the negative electrode of the lithium-ion secondary cell 20. However, the current measuring unit 17 may measure a current flowing between the latch relay 30 and the lithium-ion secondary cell 20.

Fourth Embodiment

An electric storage apparatus according to a fourth embodiment of the present invention is featured by determination based on only a current value in the case where determination using a voltage value cannot be made in a drive determining unit 15. Therefore, the configuration is identical to that of the first embodiment.

Figure 9:
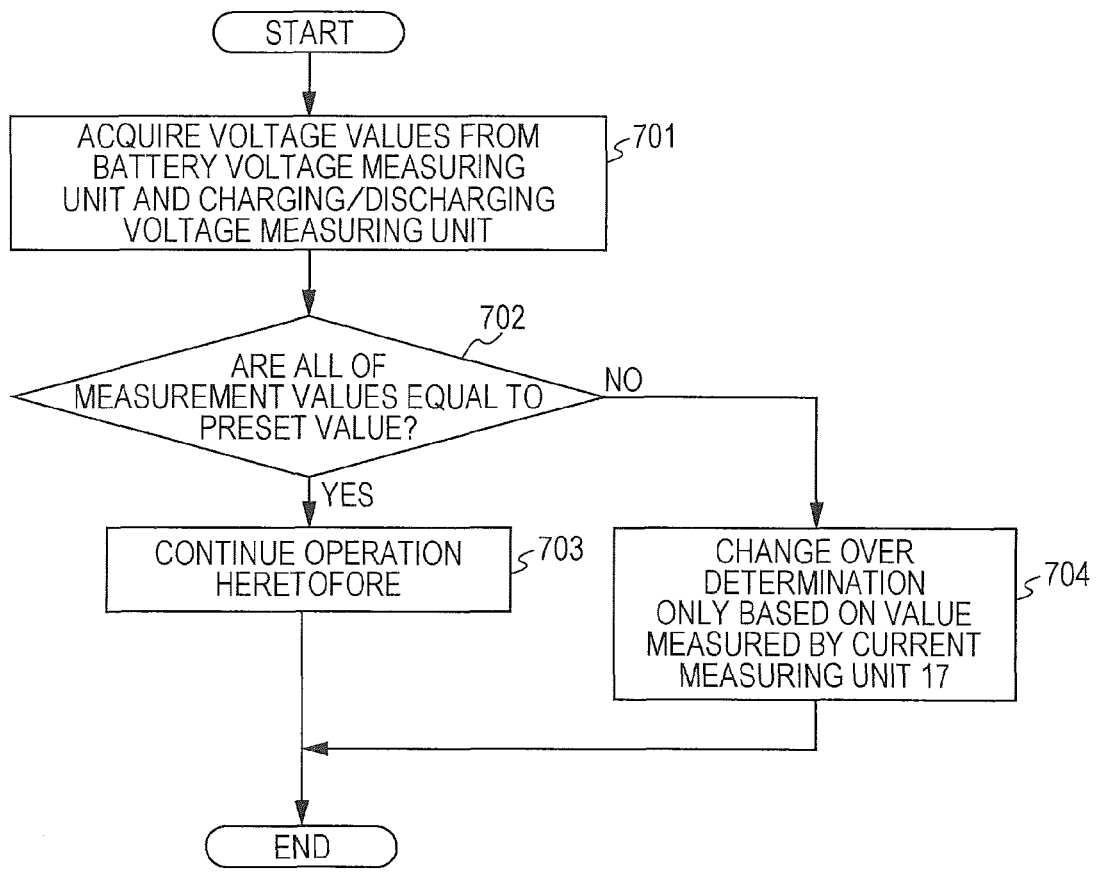
FIG. 9 is a flowchart illustrating the operation of an electric storage apparatus according to a fourth embodiment of the present invention.

First, operation for inspecting an electric storage apparatus 1 will be described with reference to the flowchart of FIG. 9. In the state in which no battery charger or outside load is connected to an outside connecting terminal 50 or the electric storage apparatus 1 does not supply or receive a current to or from a battery charger or outside load, a drive determining unit 15 acquires voltage values from a battery voltage measuring unit 11 and a charging/discharging measuring unit 12 in response to a control input from the outside or automatically (step 701). The acquired voltage values are stored in the drive determining unit 15 itself or are compared with a value preset by a drive history memory 16 (step 702). Here, the preset value is a fixed value that has been set at the time of shipment from a factory of the electric storage apparatus 1, and is equal to a measurement value when the battery voltage measuring unit 11 and the charging/discharging measuring unit 12 are normally operated under inspection condition.

Next, if the measurement values acquired from the battery voltage measuring unit 11 and the charging/discharging measuring unit 12 are equal to the preset values, the control routine proceeds to step 703, in which it is confirmed that each of the voltage measuring units is normally operated. In this manner, the inspection comes to an end. In contrast, if at least either one of the measurement values is different from the preset value, the control routine proceeds to step 704. Thereafter, the drive determining unit 15 stops the determination based on the measurement values acquired from the battery voltage measuring unit 11 and the charging/discharging measuring unit 12, and then, changes over determination based on a current value measured by the current measuring unit 17.

Specifically, steps 107 to 109 in the flowchart of FIG. 2 in the first embodiment are replaced with steps 501 and 502 in FIG. 8A. Similarly, steps 206 to 208 in the flowchart of FIG. 4 and steps 301 to 304 in the flowchart of FIG. 5 in the first embodiment are replaced with steps 501 and 502. Moreover, steps 406 to 408 in the flowchart of FIG. 7 are replaced with steps 601 and 602.

In this manner, according to the forth embodiment of the present invention, the battery voltage measuring unit 11 and the charging/discharging measuring unit 12 are inspected, and then, the determination based on the current value measured by the current measuring unit 17 is allowed to be made if there is an inconvenience. Consequently, it is possible to enhance the reliability of the determination of the malfunction of the latch relay 30.

In each of the above-described embodiments, the determination of the malfunction of the latch relay 30 by the drive determining unit 15 has been made when the electric storage apparatus 1 is electrically charged or discharged. However, the switch operation by the self-holding switch and the determination by the operation state determining means may be performed independently of the charging or discharging operation.

Such operation is exemplified by a protecting operation for opening the latch relay 30 based on temperature information monitored by the thermistor 40 or an outside temperature sensor, not illustrated, in the case where the electric storage apparatus 1 is placed in outside ambient unsuitable for the lithium-ion secondary cell 20 such as excessive high or low temperature ambient.

Specifically, in the flowchart of FIG. 7 in which the malfunction of the control for turning the latch relay 30 into the open state is determined, the latch relay 30 is operated based on the temperature measured by the thermistor 40 in place of steps 401 to 404 in which the charging/discharging operation is performed. Here, such a protecting operation may be performed irrespective of the connection to the battery charger or the outside load as long as the electric storage apparatus 1 does not electrically charge or discharge.

In each of the above-described embodiments, the electric storage apparatus 1 has been configured such that the battery voltage measuring unit 11 and the charging/discharging measuring unit 12 individually measure the potential between the two points, and then, the drive determining unit 15 determines based on the difference. However, according to the present invention, a difference between potentials upstream side and downstream side of the latch relay 30 may be directly measured, and then, the drive determining unit 15 may determine the malfunction based on the magnitude of the difference between the potentials.

In each of the above-described embodiments, the description has been given of the electric storage apparatus 1 in which the switch controller 14 in the protective circuit 10 forcibly drives the latch relay 30 under the control by the drive determining unit 15. However, the present invention may be configured such that only the drive determining unit 15 determines without forcibly driving the latch relay 30. In this case, it is much preferable to provide a unit for notifying the outside of the result of drive determination by the drive determining unit 15.

Figure 10:
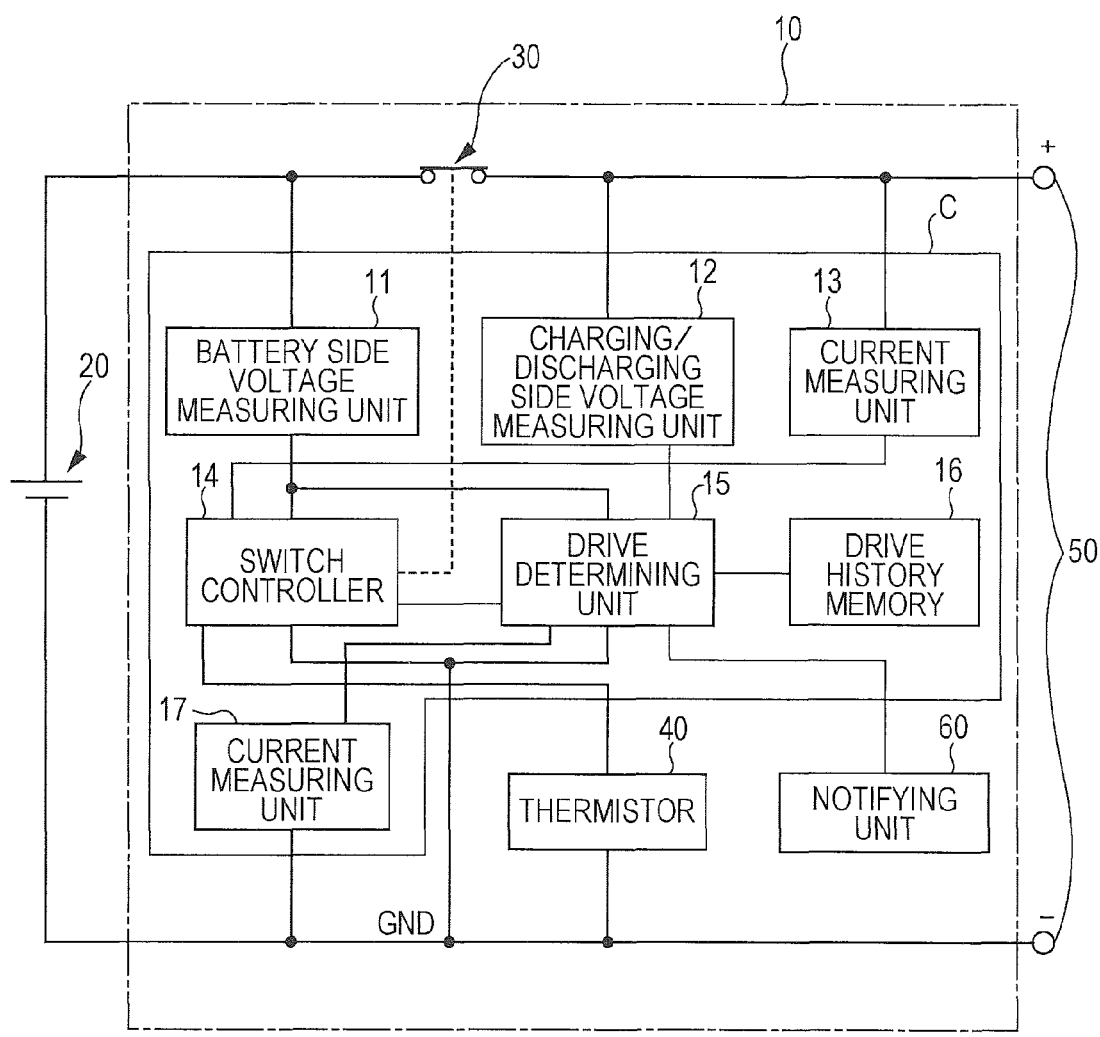
FIG. 10 is a block diagram illustrating another configurational example of an electric storage apparatus according to the embodiment of the present invention.

FIG. 10 illustrates a configurational example in which there is provided a notifying unit 60 for notifying the malfunction of a latch relay 30 upon receipt of a result determined by a drive determining unit 15. The notifying unit 60 corresponds to a notifying unit, for outputting a signal as an alarm so as to allow a user to recognize the occurrence of abnormality in an electric storage apparatus 1. The notifying unit 60 is implemented by an LCD for displaying a character, an LED for emitting a light beam, means for outputting a video picture, or sound outputting means such as a buzzer.

With the above-described configuration, the user can certainly recognize the abnormal operation of the electric storage apparatus based on the determination with the high accuracy according to the present invention. Here, the notifying unit 60 may be independently disposed as a dedicated unit or may be implemented by utilizing an indicator of the LED or the like usually used in the protective circuit. The configuration of the notifying unit 60 may be concurrently used with the configurations of the first to fourth embodiments.

In each of the above-described embodiments, the present invention has been implemented as the electric storage apparatus 1 incorporating the lithium-ion secondary cell 20 therein and having the main circuit serving as the charging/discharging circuit. However, the present invention may be implemented as a power path switch apparatus that is connected to a constant voltage power supply such as a power generator and the like or is disposed between power paths for supplying electric power between two arbitrary points, and then, functions as a protector for a power path in addition to the power supply.

Figure 11:
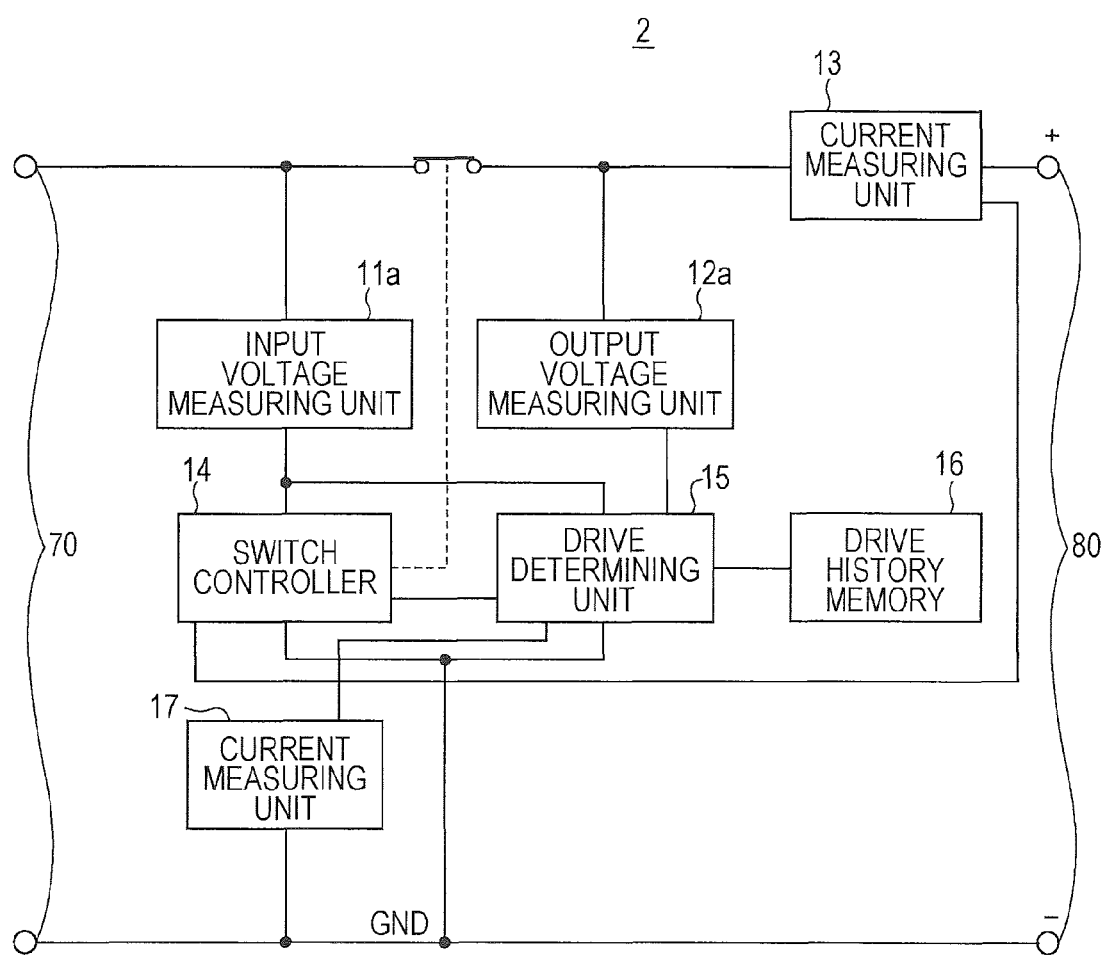
FIG. 11 is a block diagram illustrating the configuration of a power path switch apparatus according to another embodiment of the present invention.

FIG. 11 is a diagram illustrating the configuration of a power path switch apparatus 2 provided with an input terminal 70 connected to an input side of a power path and an output terminal 80 measured on an output side. Here, the same or corresponding constituent elements are designated by the same reference numerals, and therefore, the detailed explanation will be omitted below.

The basic operation of the power path switch apparatus 2 is similar to that in the first embodiment. A current value measured by a current measuring unit 13 and a voltage value measured by an input voltage measuring unit 11*a* are monitored. If there is abnormality, a latch relay 30 is operated to cut off the power path. The voltages measured by the input voltage measuring unit 11*a* corresponding to the battery voltage measuring unit 11 and an output voltage measuring unit 12*a* corresponding to the charging/discharging voltage measuring unit 12, which are disposed at both ends of the latch relay 30, are monitored all the time when it is confirmed that the operation of the latch relay 30 is in the closed state. If a difference between the voltages exceeds a predetermined value, the drive determining unit 15 determines abnormality. And then, a switch controller 14 is controlled, thereby turning the latch relay 30 into the closed state again.

With the above-described configuration, the power path cutoff or the power path switch in the emergency can be accurately determined with high reliability in the same manner as the electric storage apparatus in each of the embodiments. All of the above-described configurations of the electric storage apparatus 1 in the first to fourth embodiments may be arbitrarily applied to the power path switch apparatus 2.

In the above-described description, the self-holding switch according to the present invention has been the latch relay. However, the self-holding switch is not limited to the configuration of the well-known relay as long as it can continue the switching operation without receiving/transmitting a signal from/to the outside or consuming the electric power.

In the above-described description, the self-holding switch according to the present invention has been operated in response to the control pulse signal of 1 bit. However, the information amount is not limited to the number of bits as long as the switch is controlled in response to the pulse signal. Moreover, as long as the switch is controlled in response to the signal having the information amount of 1 bit, the format is not limited.

In the above-described description, an electric storage device according to the present invention is the lithium-ion secondary cell. However, a nickel-metal hydride rechargeable battery or other various kinds of secondary batteries may be used as long as the secondary cell is a chargeable/dischargeable battery by an electrochemical reaction. Moreover, like an electric dual layer capacitor, the electric storage apparatus may be an element of a system for directly storing electricity as an electric charge. In other words, the electric storage device according to the present invention is not limited by its specific system as long as it is an element capable of chargeably/dischargeably storing the electricity.

That is to say, each of the above-described embodiments may be variously modified within the scope without departing from the gist of the present invention.

As described above, the present invention can enhance the determination accuracy regarding the switch of the charging/discharging path or the power path so as to obtain the high reliability, and therefore, it is useful for the secondary battery and the like.

What is claimed is:

1. An electric storage apparatus, comprising:
   an electric storage device;
   an outside connecting terminal to which a power generator and an outside load operated by electric power from the electric storage apparatus are connected;
   a charging or discharging path connecting the electric storage device to the outside connecting terminal;
   a potential difference measuring unit for measuring a potential difference at two points on the charging or discharging path, the two points on the charging or discharging path being located between a positive electrode of the electric storage device and the outside connecting terminal;
   a self-holding switch disposed between the two points on the charging or discharging path;
   a current measuring unit for measuring a current flowing through the two points on the charging or discharging path;
   a switch controller for controlling switching of the self-holding switch, based on at least a state of the electric storage device, to an open state of the self-holding switch or a closed state of the self-holding switch;
   an operational state determining unit for determining an operational state of the self-holding switch, as one of an open operational state and a closed operational state, based on a control state of the switch controller and at least one of a result measured by the potential difference measuring unit and a result measured by the current measuring unit; and
   a drive history memory that stores a latest control state of the switch controller,
   wherein the operational state determining unit causes the switch controller to drive the self-holding switch in a case where the operational state of the self-holding switch and the latest control state of the switch controller are different from each other such that the operational state of the self-holding switch matches the latest control state.

2. The electric storage apparatus according to claim 1, wherein the current measuring unit measures the current between the electric storage device and the self-holding switch or at one arbitrary point on a path connected to a negative electrode of the electric storage device.

3. The electric storage apparatus according to claim 1, wherein, in a case where the switch controller controls the self-holding switch so as to turn it into the closed state of the self-holding switch, the operational state determining unit determines that the operational state of the self-holding switch is the open operational state when a difference between an electric storage device voltage between the electric storage device and the self-holding switch and a charging or discharging voltage between the self-holding switch and a charging source or a discharging destination becomes a predetermined value or more.

4. The electric storage apparatus according to claim 1, wherein, in a case where the switch controller controls the self-holding switch so as to turn it into a closed state of the self-holding switch, the operational state determining unit determines that the operational state of the self-holding switch is the open operational state when a range of fluctuations of a difference between an electric storage device voltage between the electric storage device and the self-holding switch and a charging or discharging voltage between the self-holding switch and a charging source or a discharging destination becomes a predetermined value or more.

5. The electric storage apparatus according to claim 1, wherein, in a case where the switch controller controls the self-holding switch so as to turn it into a closed state of the self-holding switch, the operational state determining unit determines that the operational state of the self-holding switch is the open operational state, when a magnitude of a difference between an electric storage device voltage between the electric storage device and the self-holding switch and a charging or discharging voltage between the self-holding switch and a charging source or a discharging destination or the range of fluctuations of the difference becomes a predetermined value or more, and further, the current measured by the current measuring unit is substantially 0 [A].

6. The electric storage apparatus according to claim 1, wherein, in a case where the switch controller controls the self-holding switch so as to turn it into the open state of the self-holding switch, the operational state determining unit determines that the operational state of the self-holding switch is the closed operational state when a difference between an electric storage device voltage between the electric storage device and the self-holding switch and a charging or discharging voltage between the self-holding switch and a charging source or a discharging destination becomes substantially 0 [V].

7. The electric storage apparatus according to claim 1, wherein, in a case where the switch controller controls the self-holding switch so as to turn it into the open state of the self-holding switch, the operational state determining unit determines that the operational state of the self-holding switch is the closed operational state, when a difference between an electric storage device voltage between the electric storage device and the self-holding switch and a charging or discharging voltage between the self-holding switch and a charging source or a discharging destination becomes substantially 0 [V], and further, the current measured by the current measuring unit is substantially larger than 0 [A].

8. The electric storage apparatus according to claim 1, wherein the self-holding switch is switched in response to a pulse signal.

9. The electric storage apparatus according to claim 1, wherein the self-holding switch comprises a latch relay.

10. The electric storage apparatus according to claim 1, further comprising:
a notifying unit for notifying an alarm in a case where the operational state of the self-holding switch determined by the operational state determining unit is different from the control state of the switch controller.

11. The electric storage apparatus according to claim 1, wherein the charging or discharging path includes a negative power path and a positive power path including first and second power paths,
wherein the self-holding switch serially connects the first power path to the second power path, and
wherein the potential difference measuring unit measures a potential difference between the first power path and the second power path.

12. A power path switch apparatus, comprising:
a negative power path;
a positive power path including first and second power paths;
a self-holding switch that serially connects the first power path to the second power path;
a potential difference measuring unit for measuring a potential difference between the first power path and the second power path;
a current measuring unit for measuring a current flowing through the negative power path or the positive power path;
a switch controller for controlling switching of the self-holding switch to an open state of the self-holding switch or a closed state of the self-holding switch;
an operational state determining unit for determining an operational state of the self-holding switch, as one of an open operational state and a closed operational state, based on a control state of the switch controller and at least one of a result measured by the potential difference measuring unit and a result measured by the current measuring unit; and
a drive history memory that stores a latest control state of the switch controller,
wherein the operational state determining unit causes the switch controller to drive the self-holding switch in a case where the operational state of the self-holding switch and the latest control state of the switch controller are different from each other such that the operational state of the self-holding switch matches the latest control state.

13. A power path switch method used in a power path switch apparatus that includes a negative power path, a positive power path including first and second power paths, and a self-holding switch that serially connects the first power path to the second power path, the method comprising:
measuring a potential difference between the first power path and the second power path;
measuring a current flowing through the negative power path or the positive power path;
controlling switching of the self-holding switch to an open state of the self-holding switch or a closed state of the self-holding switch;
determining an operational state of the self-holding switch, as one of an open operational state and a closed operational state, based on a control state of the switch controller and at least one of a measurement result of a potential difference and a measurement result of a current;
storing a latest control state of the switch controller; and
causing the switch controller to drive the self-holding switch in a case where the operational state of the self-holding switch and the latest control state of the switch controller are different from each other such that the operational state of the self-holding switch matches the latest control state.

* * * * *